United States Patent
Vajhallya et al.

(10) Patent No.: US 7,983,335 B2
(45) Date of Patent: Jul. 19, 2011

(54) AVC I_PCM DATA HANDLING AND INVERSE TRANSFORM IN A VIDEO DECODER

(75) Inventors: Manoj Vajhallya, Bangalore (IN); R. Lakshmikanth Pai, Bangalore (IN)

(73) Assignee: Broadcom Corporation, Irvine, CA (US)

( * ) Notice: Subject to any disclaimer, the term of this patent is extended or adjusted under 35 U.S.C. 154(b) by 1652 days.

(21) Appl. No.: 11/263,985

(22) Filed: Nov. 2, 2005

(65) Prior Publication Data

US 2007/0098081 A1    May 3, 2007

(51) Int. Cl.
*H04B 1/66* (2006.01)
*H04N 7/12* (2006.01)
*H04N 11/02* (2006.01)
*H04N 11/04* (2006.01)
(52) U.S. Cl. ............... 375/240; 375/240.01; 375/240.02
(58) Field of Classification Search ................... 375/240, 375/240.02
See application file for complete search history.

(56) References Cited

U.S. PATENT DOCUMENTS

| | | | |
|---|---|---|---|
| 4,849,812 A * | 7/1989 | Borgers et al. | 348/400.1 |
| 6,414,992 B1 * | 7/2002 | Sriram et al. | 375/240.13 |
| 6,445,828 B1 * | 9/2002 | Yim | 382/250 |
| 6,539,120 B1 * | 3/2003 | Sita et al. | 382/233 |
| 7,395,210 B2 * | 7/2008 | Li | 704/500 |
| 7,693,709 B2 * | 4/2010 | Thumpudi et al. | 704/205 |
| 7,873,225 B2 * | 1/2011 | Wallace et al. | 382/232 |
| 2003/0185298 A1 * | 10/2003 | Alvarez et al. | 375/240.03 |
| 2005/0018774 A1 * | 1/2005 | Winger et al. | 375/240.23 |

* cited by examiner

*Primary Examiner* — Vikkram Bali
*Assistant Examiner* — Michelle Entezari
(74) *Attorney, Agent, or Firm* — McAndrews, Held & Malloy, Ltd.

(57) ABSTRACT

An Inverse Transform (IT) conforming to MPEG AVC I_PCM that offers better video image quality than the MPEG-2/H.263 based video decoders and real time motion picture processing at 30 frames/seconds is described. The IT module performs 4×4 Inverse Integer transform for AVC for MPEG-2 operations on a given macro block (MB) and all its sub blocks. The IT is the third module in the data flow pipeline of a video decoder, the first two being a variable length decoder (VLD) and an inverse quantizer (IQ). The IT module gets its inputs from IQ module and feeds its processed output to a Motion compensation unit/intra-prediction (MCU-IP) module, thus reconstructing the video picture.

6 Claims, 7 Drawing Sheets

AVC I_PCM DATA HANDLING AND INVERSE TRANSFORM IN A VIDEO DECODER

FIELD OF THE INVENTION

This invention relates generally to video communication systems and more particularly to AVC I_PCM based data manipulation and inverse transformation used in a video decoder of such communication systems.

DESCRIPTION OF THE RELATED ART

A video decoder decodes compressed digital video data received in a plurality of formats: MPEG-1 for transmission and storage up to a throughput of 1.5 Mbps, MPEG-2 broadcast quality transmission and reception up to 15 Mbps, and H.263 for videophone and video conference. All these decoders are based on discrete cosine transform (DCT) and inverse discrete cosine transform to effect a modest amount of compression with acceptable quality of the image. However, the quality degrades if more compression is effected by coarsely quantizing the DCT transformed coefficients at the encoder and applying inverse quantization and inverse transformation at the decoder. It also produces undesirable blocking artifacts in the reconstructed picture. On the other extreme, MPEG-4 and Motion JPEG 2000 decoders are based on discrete wavelet transform (DWT) and are highly computationally intensive and hence fall far short of the acceptable frame rate of 30 frames/second for satisfactory reproduction of a motion picture.

Further limitations and disadvantages of traditional and conventional approaches will become apparent to one of ordinary skill in the art through comparison of such systems with the present invention.

DETAILED DESCRIPTION OF THE INVENTION

Figure 1:
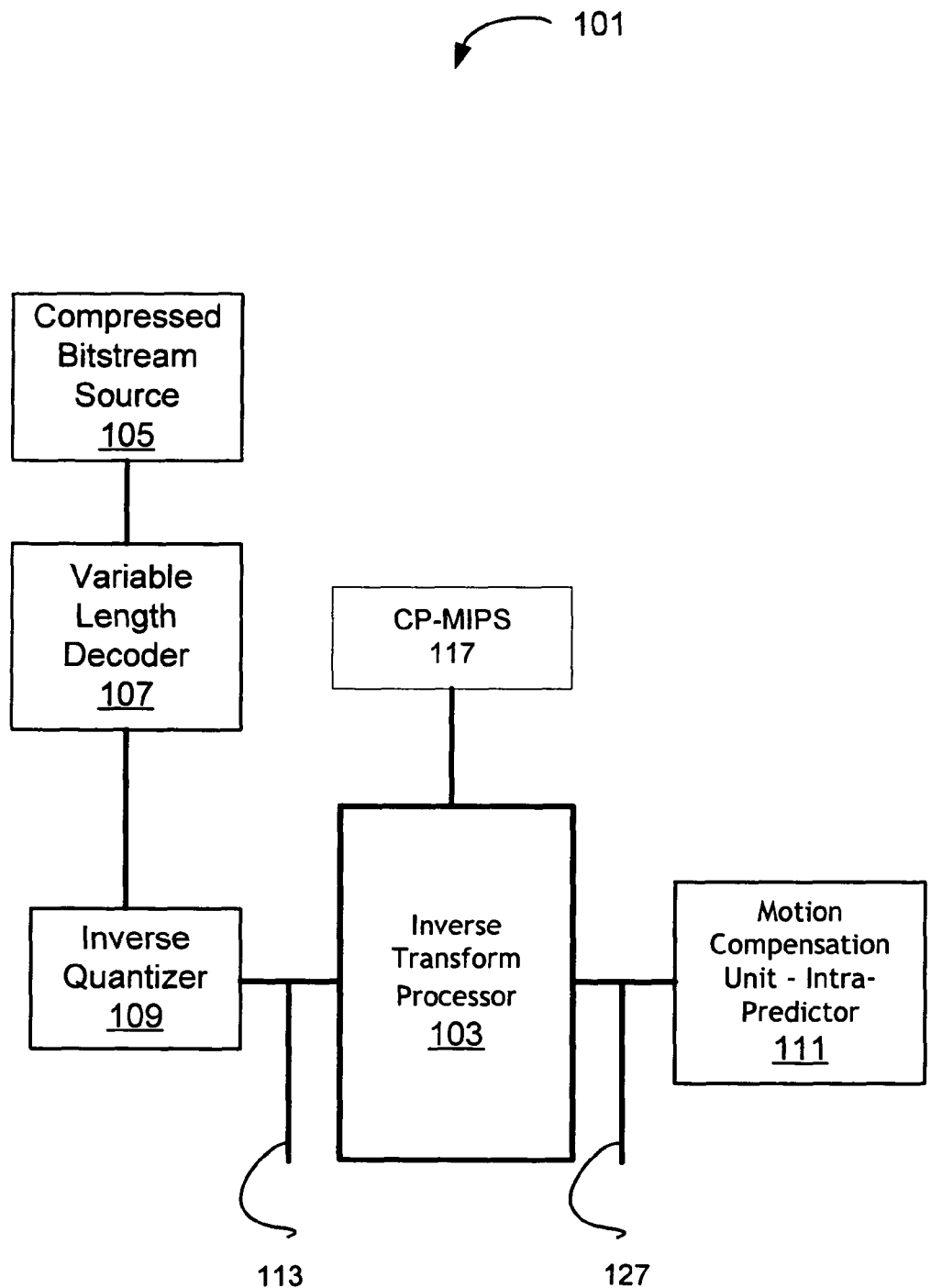
FIG. 1 is a schematic diagram illustrating an AVC I_PCM based video decoder communication system constructed according to the present invention.

Advanced Video Codec (AVC) is an emerging next generation video codec technology being developed by the industry. It is often used for real-time encoding of video data. Differences in the implementations of AVC and other next generation video codecs vary more than in the algorithms themselves. Some of the differences are due to computational complexity and others in performance losses. The implementation of the inverse transform (IT) operations in a video decoder makes a difference in the performance and compression levels achievable. An IT module may be used as the third module in the data flow pipeline of a video decoder, the first two being a variable length decoder (VLD) and an inverse quantizer (IQ). The IT module gets its inputs from an IQ module and feeds its processed output to a Motion compensation unit/intra-prediction (MCU-IP) module, thus reconstructing the video picture. The outputs are always fed as 8×8 pixel blocks in a raster scan order for all standards.

The IT module, in accordance with the present invention, supports processing of MPEG-2 coded streams and other types of coded streams. The emerging high-efficient H.264, or MPEG-4 Part 10: Advanced Video Coding (AVC) video compression standard is on its way to become a general replacement for the rather old MPEG-2 standard, and the IT module also supports that. For MPEG-4 type data, defined combinations of hierarchical profiles and levels are structured in a hierarchical way—(profile@level), such MainProfile@HighLevel, with an abbreviation: MP@HL. For the MPEG-2 format stream, the IT module performs an 8×8 inverse DCT. It also performs rounding/saturation that meets the IEEE Std. 1180-1990, 6 Dec. 1990.

The IT module supports processing of AVC coded streams. For the AVC coded streams, the IT module performs inverse integer transform for 4×4 sub blocks with AVC specific rounding/saturation. It handles I_PCM (Intra block pulse code modulation) macro blocks (MB) properly, i.e., pass through without performing inverse transform operation. In the I_PCM MBs, the luminance (luma) pixels are presented in a 16×16 raster scan order and the chrominance (chroma) pixels are presented in a 8×8 raster scan order. The luma pixels are reordered by the IT module to 8×8-raster scan order before sending to MCU-IP.

In general, the IT module decodes the AVC, MPEG-2 and related video data streams:

an AVC Main Profile.

a MP@HL (including SD) decoding for DVB, ATSC and MPEG streams.

The video encoder, in accordance with the present invention, supports intra-frame prediction. An Intra_4×4 mode is based on predicting each 4×4 luma block separately and is well suited for coding of parts of a picture with significant detail. The Intra_16×6 mode, on the other hand, does prediction of the whole 16×16 luma block and is more suited for coding very smooth areas of a picture. In addition to these two types of luma prediction, a separate chroma prediction is conducted. As an alternative to Intra_4×4 and Intra_16×16, the I_PCM coding of block allows the encoder to simply bypass the prediction and transform coding processes and, instead, directly send the values of the encoded samples.

An Inverse Transform (IT) module conforming to MPEG-2, AVC-I_PCM constructed according to the present invention overcomes the shortcomings of the prior art devices and comprises a DINO DECODER, a proprietary RBUS interface and registers, a PASS-1 inverse transform module, a PASS-2 inverse transform module, a DINO ENCODER and a DINO command sequence and bypass mode FIFO. The IT module performs, on a given macro block (MB) and all its sub blocks, the operations of a 4×4 Inverse Integer transform for AVC and an 8×8 Inverse DCT for MPEG-2.

FIG. 1 is a schematic diagram illustrating an AVC I_PCM based video decoder communication system 101 constructed according to an embodiment of the present invention. The video decoder system 101 includes an incoming compressed bit stream source 105, a variable length decoder (VLD) 107, an inverse quantizer (IQ) 109, an inverse transform processor (IT module) 103, and a motion compensation unit/intra-prediction (MCU-IP) module 111.

The incoming bit stream 105, which is a compressed video data generated by a video encoder, is provided to the variable length decoder (VLD) 107. The VLD 107 decodes the bit stream and extracts the actual video data based on header information embedded in the bit stream. The extracted data is in a variable word format and is subjected to inverse quantization by the inverse quantizer 109 to get de-quantized coefficients. These coefficients are fed as inputs to the inverse transform (IT) module 103, which applies integer transform conforming to AVC, handle AVC I_PCM and Inverse DCT to MPEG-2. The IT module gets its inputs from IQ module 109 and feeds its processed output to the motion compensation unit/intra-prediction (MCU-IP) module 111, thus reconstructing the video picture.

The IT module 103 performs a 4×4 Inverse Integer transform for AVC and 8×8 IDCT for MPEG-2 operations on a given macro block (MB) and all its sub blocks. The IT module 103 allows I_PCM macro blocks to pass through without performing inverse transform operation. In I_PCM macro blocks, the luminance coefficients are present in a 16×16 raster scan order and the chrominance coefficients are present in an 8×8 raster scan order. The luminance coefficients are reordered to 8×8 raster scan order before sending to MCU-IP 111.

Figure 2:
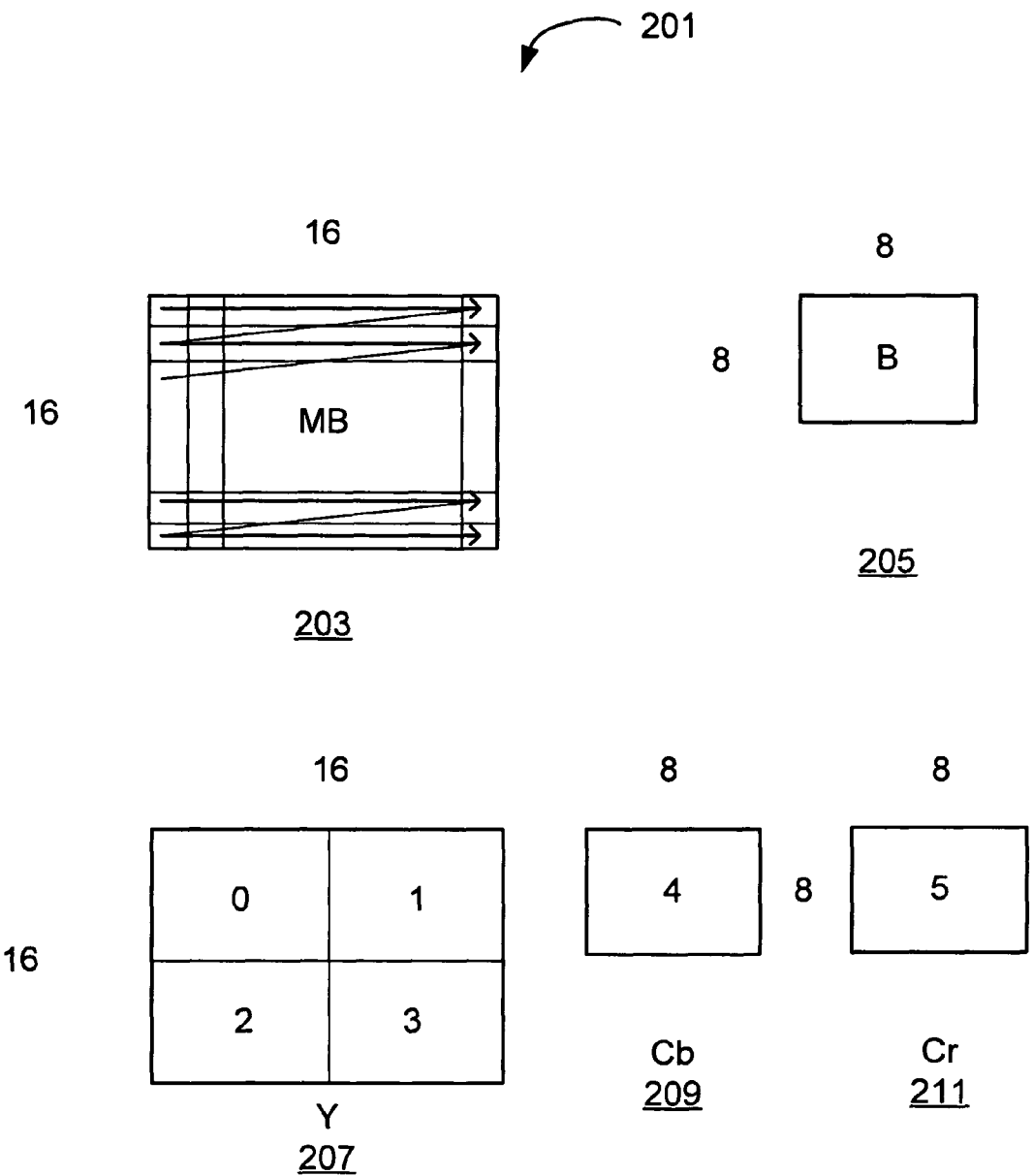
FIG. 2 depicts the order of processing the inverse transform for I_PCM and non I_PCM types of data.

FIG. 2 depicts the order of processing 201 the inverse transform for I_PCM and non I_PCM types of data. A raster scan order is the order of processing a matrix of data from left to right and top to bottom in the same way a printed text is read. A macro block 203 (MB) consists of coefficients arranged as 16×16 matrix. The raster scan order is shown by arrows within MB 203. Each square represents a coefficient, with the first coefficient at the top left handed corner of the MB 203. A block B 205 is of size 8×8. A color picture is processed macro block by macro block in 4:2:0 format. In this format, a macro block consists of six 8×8 blocks with four luminance, Y0 to Y3 and two color components, Cb and Cr. The color components are obtained by sub sampling the respective 16×16 color component data by two, i.e., by taking every alternate sample, both in the horizontal as well as in the vertical directions, thus obtaining 8×8 coefficients from 16×16 coefficients. The order of processing these blocks are 0, 1, 2 to 5 as marked in 207 to 211.

Figure 3:
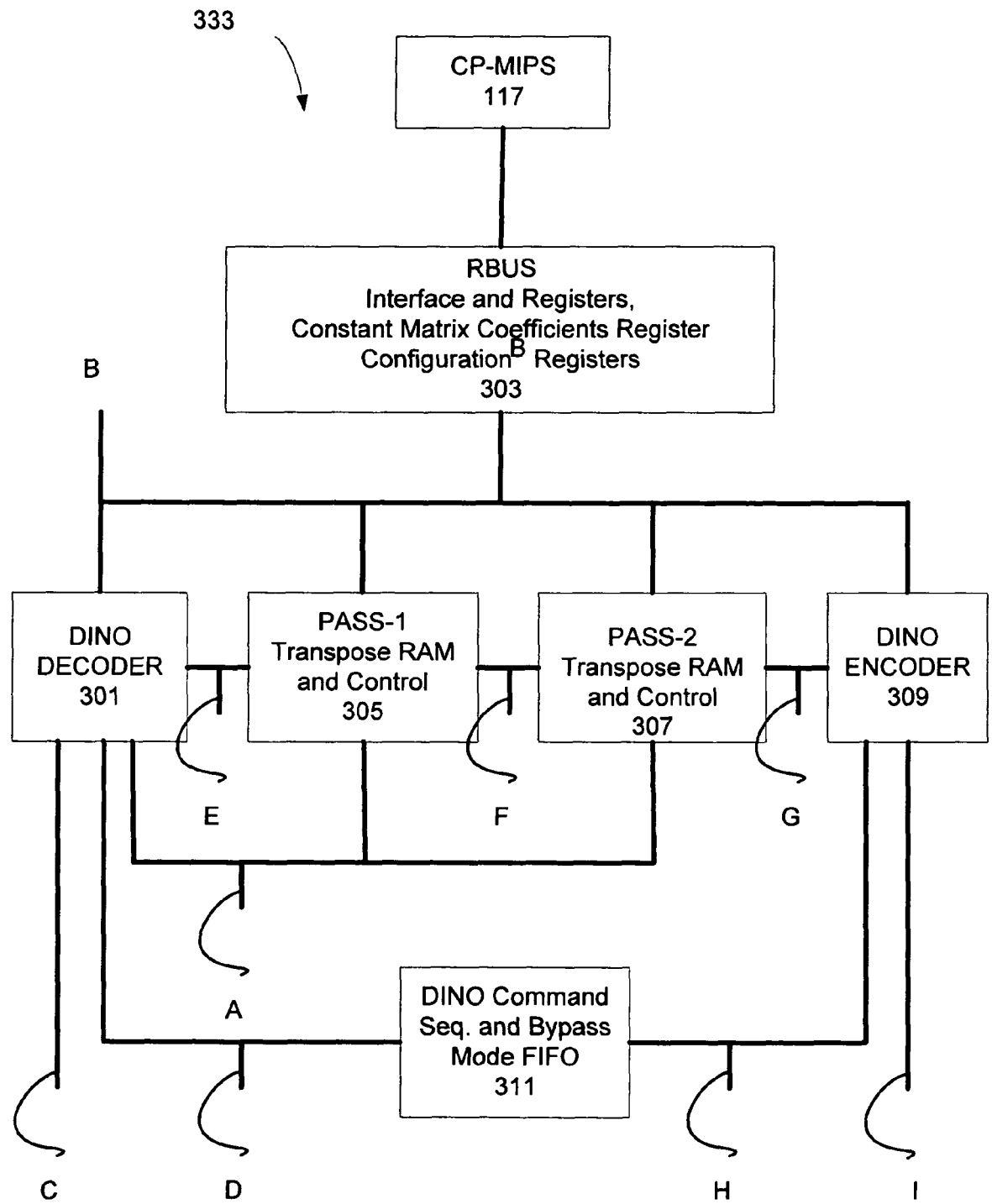
FIG. 3 is a schematic block diagram illustrating an inverse transform module of an AVC I_PCM based video decoder communication system.

FIG. 3 is a schematic block diagram illustrating an inverse transform module 333 of an AVC I_PCM based video decoder communication system 101 that includes a DINO Decoder 301, a proprietary RBUS interface and registers 303, a PASS-1 IT Operation 305, a PASS-2 IT Operation 307, a DINO Encoder 309 and a DINO Command Sequence and Bypass Mode FIFO 311. The DINO interface in IT module 103 with IQ 109 and MCU 111 modules use Ready/Accept Protocol, whereas the Control Processor MIPS Processor (CP-MIPS) uses the proprietary RBUS interface to configure the RBUS configuration registers in the IT 333 module appropriately.

Following are some of the functions performed by the inverse transform module 333:
Inverse integer transforms for 4×4 blocks in AVC.
Handling I_PCM Macro blocks in case of AVC, pass them to MCU-IP module 111 without performing inverse integer transform operation.
8×8 Inverse DCT in the case of MPEG-2.
Rounding/saturation mechanism conforming to the IEEE Std. 1180-1990, 6 Dec. 1990 for MPEG-2.
Supports 4:2:0 format, as an example. In the context of IT module, six 8×8 blocks (4 luminance and 2 color components) are processed for every macro block.
Sends IT output coefficients in 8×8 blocks in a raster scan order.
Completely bypass all the IT operation when IT bypass mode is enabled.
The DINO commands are sent out from IT module 333 to the MCU-IP 111 in the same order in which they were received by the IT module 333 from the IQ 109. Those DINO commands that are not required for MCU-IP module 111 are dropped from the IT module 333.
IT achieves the clock cycles budget by processing a MB within 794 clock cycles, supplying the transformed output to MCU-IP module 111.

In general, the IT module 333, in accordance with the present invention, has three interfaces:
a DINO input interface to an external IQ module output;
a DINO output interface to an external MCU-IP module; and
a proprietary RBUS interface that is used to connect to an internal CP-MIPS.

The DINO interface with IQ and MCU modules uses a Ready/Accept Protocol, whereas the CP-MIPS uses the proprietary RBUS interface to configure the RBUS configuration registers in the IT module appropriately.

The DINO DECODER 301 is operable to receive or send a plurality of control and handshake signals from a plurality of functional modules such as the RBUS interface and registers 303, a PASS-1 module 305, a PASS-2 module 307, a DINO ENCODER 309 and a DINO command sequence and bypass mode FIFO 311. The DINO DECODER is also capable of receiving a video data input from the external IQ module, and thereby producing a plurality of data, address, control and handshake signals to communicate with the said functional modules.

The RBUS interface and registers 303 is operable to receive or send a system configuration information etc. from or to a CP. It is communicatively coupled to the PASS-1 305 and the PASS-2 307 modules to pass on configuration information and a constant coefficient matrix.

The PASS-1 module 305 is operable to receive configuration information and constant coefficient matrix from RBUS interface and registers module 303 and receive a plurality of data from the DINO DECODER 301 and also receive a T1 write address (I_PCM) from the DINO DECODER 301. The PASS-1 is also capable of and receiving a rd_addr1 from the PASS-2 module 307 and is communicatively coupled to the DINO DECODER 301 and the PASS-2 module 307 to receive or send control signals to the above modules, and thereby produce a data output for use by the PASS-2 module 307.

The PASS-2 module 307 is operable to receive configuration information and constant coefficient matrix from the RBUS interface and registers module 303 and to receive an I_PCM MB data and a T2 write address (I_PCM) from the DINO DECODER 301. It is capable of receiving a rd_addr2 from the DINO ENCODER 309 and also receiving data from PASS-1 module 305. The PASS-2 module is communicatively coupled to the PASS-1 module 305 and the DINO ENCODER 309 to receive or send control signals to the above modules, and thereby produce a data output for use by the DINO ENCODER 309 and rd_addr1 output for PASS-1 module 301.

The DINO command sequence and bypass mode FIFO 311 is operable to receive the DINO command sequence and bypass mode information, store it in FIFO and, thereby output the information in the same order received by a DINO ENCODER 309.

The DINO ENCODER 309 is operable to receive or send the handshake signals in the I_PCM case from the DINO DECODER 301, and to receive a data input from the PASS-2 module 307, and communicatively coupled to the PASS-2 module 307 and the DINO command sequence and bypass mode FIFO 311 and thereby produce an output address rd_addr2 to PASS-2 module 307 and an inverse transformed output data to an external Motion Compensation Unit—Intra-Prediction (MCU-IP) for further processing before a picture is reconstructed.

The sequence of operations of the IT module is as follows:
Before processing each frame of a video sequence, the CP-MIPS performs the following initialization operation.
Configure RBUS registers that contains the constant transform coefficients in order to carry out inverse transforms on 8-point or 4-points or both, based on the type of decoding.
Configure the RBUS block type configuration registers to enable or disable rounding and saturation that is used in different video data stream types.
IT module is always ready to receive and process DINO inputs from an external IQ module. The IT module starts whenever there is a valid DINO data input from IQ. DINO command to IT module is expected only after Step 1 is processed.
IT module decodes the DINO command word of a MB, extracts the relevant information required for IT module 333 and passes the DINO commands to MCU-IP module.
After performing the IT operation on each (sub) block, the pixels are packed into 8×8 blocks in a raster scan order and sent out to the MCU-IP module.

The CP-MIPS 117 uses the RBUS interface 303 to configure the RBUS configuration registers appropriately. It also supplies constant coefficients matrix for the computation of 1-D inverse transformation. In case a specific flag in RBUS register 303 is enabled, then the block type information is extracted and that particular block type is registered into a block type information register for use by PASS-1 controller, described later as 501. The control sub module of the DINO decoder also pushes the DINO command, which needs to be passed to MCU-IP 111, into DINO command sequence FIFO 311 to keep the command sequences in the same order of their arrival. Also some of the DINO commands not required by MCU-IP 111 will get dropped in the IT module after extraction of the required information. In a macro block, the total DINO commands from IT 103 to MCU-IP 111 are four in number.

Figure 4:
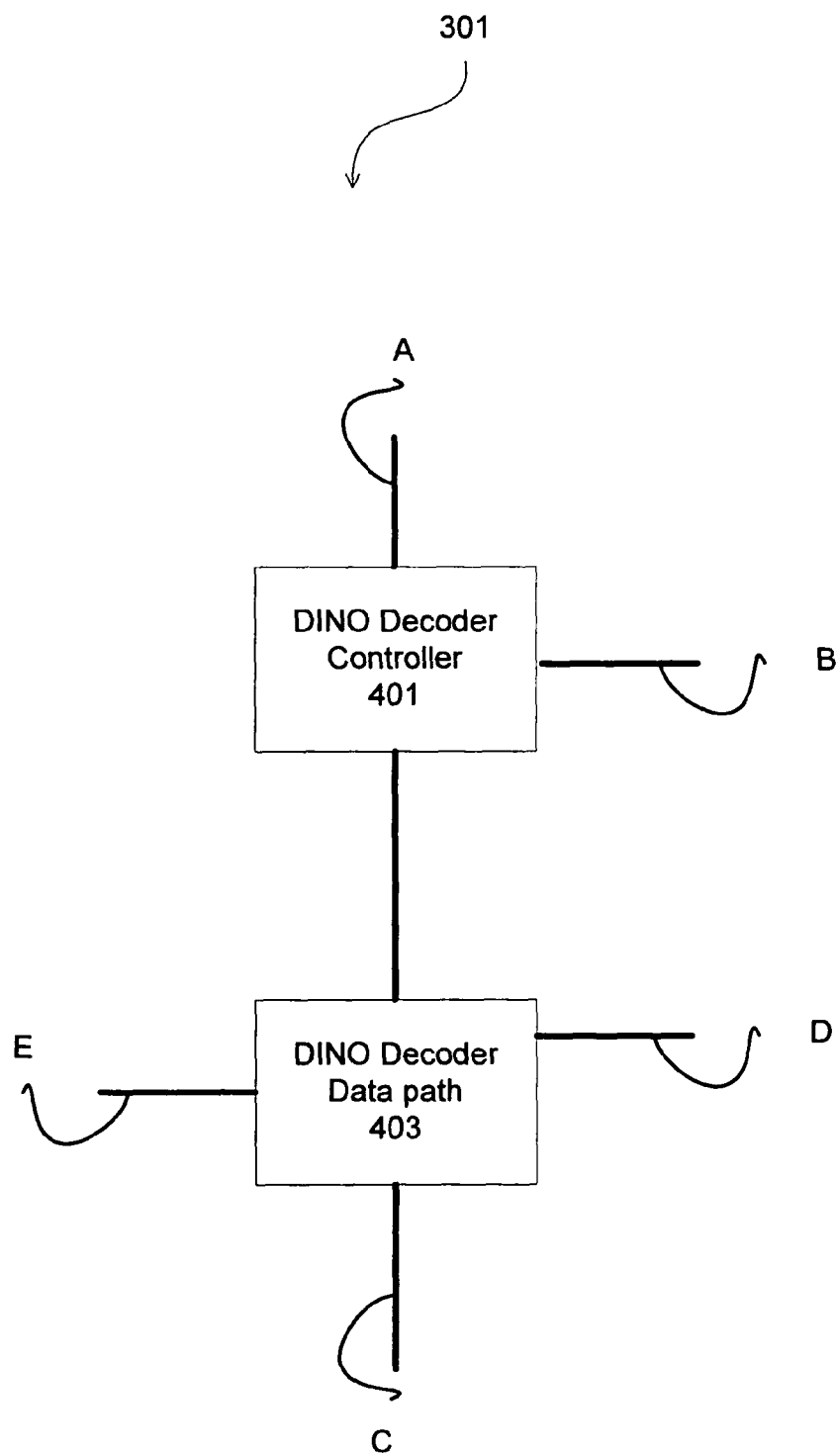
FIG. 4 is a schematic block diagram of a DINO DECODER.

FIG. 4 is a schematic block diagram of a DINO DECODER 301 that is part of the IT module described in FIG. 3. The DINO DECODER 301 sub-module receives the DINO data and command words from an external IQ module 109. This sub-module decodes DINO command words, obtains relevant control information and stores it for use for the corresponding block (or macro block) as it passes through the IT module 103 pipeline and also pushes the command into the DINO command sequence FIFO 311 to keep track of the DINO command sequence in synchronization with the processed data.

The DINO DECODER 301 includes a DINO decoder controller 401 and a DINO decoder datapath 403. The data-path of DINO decoder 403 interfaces with the IQ module 109 using the ready/accept "ping-pong receiver" protocol. The DINO data input to this module is registered first. The DINO decoder controller 401 manages a state machine (SM) that gets the registered DINO data and decodes the DINO command words and extracts the following information:
Macro-block coding type and
Block type for all the six blocks.
When DINO Decoder controller sub module 401 detects the coefficient data, it copies them into PASS-1 data-path 503 shown in FIG. 5, cache registers based on an associated block type. In the case of AVC I_PCM MBs, in order to bypass the IT operation, the DINO Decoder controller sub module 401 passes the block data to either Transpose RAM-1 (described later 509) or Transpose RAM-2 (described later as 609). In the case of I_PCM MB's, the luma pixels are present in 16×16 raster scan order and the chroma pixels are present in 8×8 raster scan order. The luma pixels need to be reordered as 8×8 raster scan order before sending them over to MCU-IP 111. This raster scan order change is achieved without compromising the following three goals:
No extra buffers; manage with the available 2 transpose RAMs (each of size 128 depth).
No input stalls, provided evacuation into MCU-IP 111 is smooth and without stalls.
Achieving the first two goals should not make IT block's control logic too complex.

The DINO Decoder controller 401 receives the DINO video data from IQ module 109 via using ready/accept protocol and decodes the DINO data stream. If the DINO word is 'command', then it is pushed into command sequence (CS) FIFO 311 and, the block type and MB type information from MB header commands are extracted. If the DINO words are 'data', then they are pushed into PASS-1 data path 503. When Transpose RAM (T1) buffer 509 is available for a block data write and first row of a block data has arrived, then a trigger signal is generated to PASS-1 state machine 501. This state machine also takes care of handling I_PCM MBs data. In that case, the state machine uses both T1 and T2 buffers and generates appropriate controls to write data either in T1 or in T2 buffer.

A scheme is in place to handle I_PCM inside IT 103 that meets all the above three goals. Accordingly, for I_PCM macro-blocks, the T1 and T2 buffers are used in a particular way. In this case, T1 and T2 together form a double buffer. The Y0, Y1 blocks of I_PCM MB are written into T1 buffer first, and then Y2, Y3 blocks are written into T2 buffer. While Y2, Y3 blocks are written into T2 buffer, DINO ENCODER 309 reads Y0, Y1 blocks concurrently. By the time Y2, Y3 are written into T2 buffer, Y0, Y1 reads are also completed. This is followed by Cb block being written into T1 buffer and DINO ENCODER 309 reading Y2 block from T2 buffer. Once Y2 block read from T2 buffer is complete, Cr block will be written into T2 buffer, while Y3 is being read. When Y3 read from T2 is complete, Cr write is also completed in parallel. Then DINO ENCODER 309 reads Cb and Cr from T1 and T2 buffers subsequently. DINO Decoder state machine 401 handles the writing of the data into T1 and T2 buffers and also communicates with DINO encoder state machine 501. When IT module 103 bypass mode is enabled, then the block SM 401 pushes all the DINO words (both command and data) into the DINO sequence FIFO 311. The DINO command sequence FIFO 311 is typically of size 1 Mega bytes storing the DINO commands on first-in, first-out basis.

Figure 5:
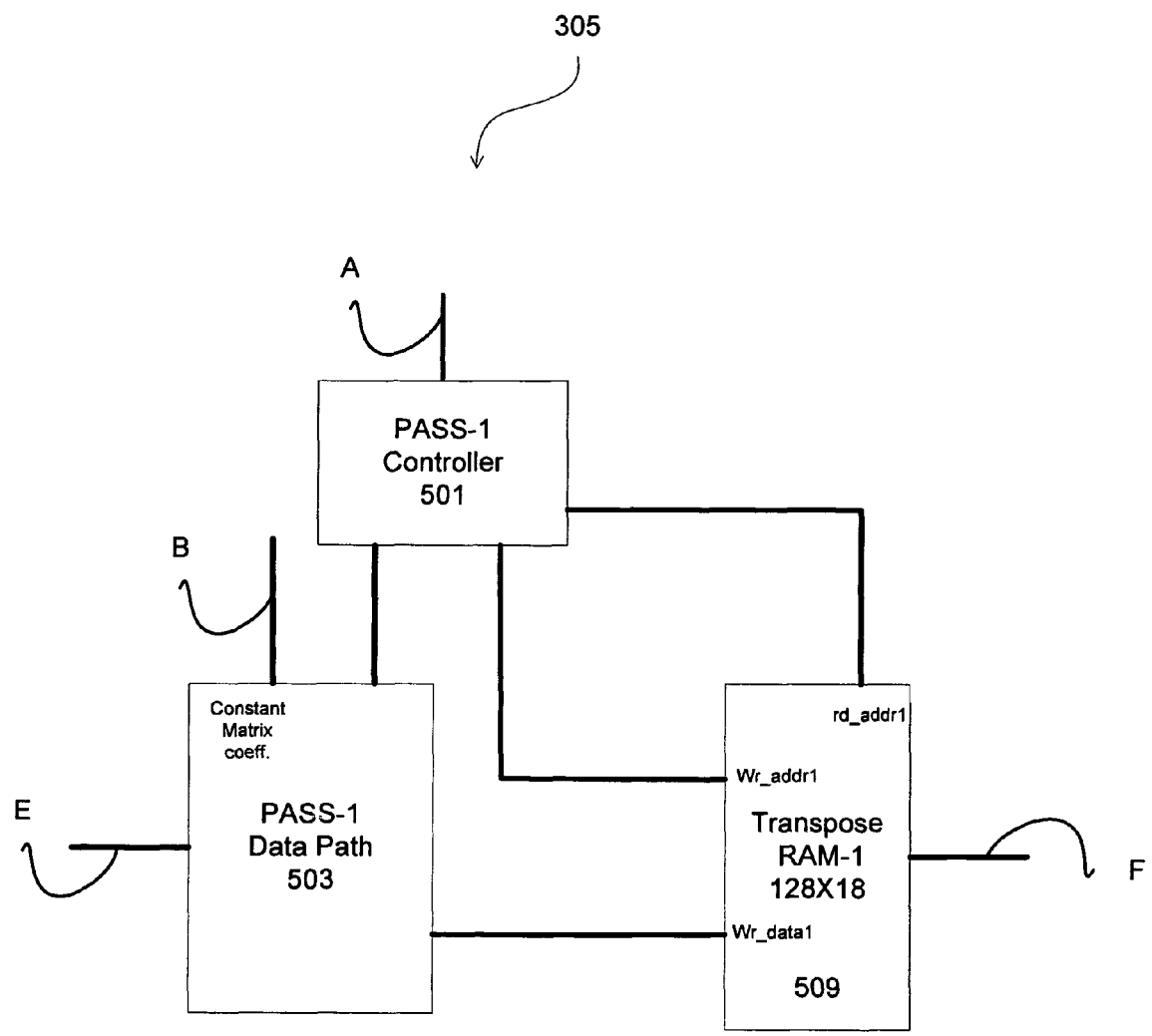
FIG. 5 is a schematic block diagram illustrating a PASS-1 Inverse Transform module from FIG. 3.

FIG. 5 is a schematic block diagram illustrating a PASS-1 Inverse Transform module 305 from FIG. 3. This sub-module receives the coefficient data from the DINO DECODER 301 and applies the 1-D IT operation based on the block type and stores them in transposed form in the Transpose RAM-1 buffer 509. The PASS-1 sub-module data-path 503 is shown in the figure. This sub-module performs a 4×4 or a 4×8 matrix multiplication based on the block type. A constant coefficient matrix is formed from the RBUS coefficient registers and is distributed to the multipliers based on the block type, after which the multiplications are carried out. The data-path of this sub-module 503 is designed to generate one coefficient every clock cycle such that the overall processing time per MB is contained in a time budget of 794 clock cycles including a pipeline delay or latency of 15 clock cycles. The sub-module has 8 cache registers to cache 8 coefficients of the row being processed, while the previous row coefficients are still under use.

Once DINO DECODER 301 collects the first 8 coefficients in the cache register, then the cache register is copied in coefficient registers and, the next row of 8 coefficients is received in cache registers. The data-path 503 has 4 multipliers in parallel and a 4 input adder to get the partial result. The final result is generated either by add or subtract with the next partial result based on the decoding and block types. In order to compute one row of the 4×4 matrix multiplication having 4 coefficients in the result matrix in the case of AVC, the system needs to perform four numbers of (1×4), (4×1) multiply and accumulate operations. Similarly, in order to compute one row of the 4×8 matrix multiplications in the case of MPEG-2, having 8 coefficients in the result matrix, the system needs to perform eight (1×4), (4×1) multiply and accumulate operations. The final eight coefficients are generated by either add or subtract operations as is appropriate. In this sub-module, rounding or saturation on each coefficient is also applied. The configurable rounding or saturation registers supports this operation. The particular rounding and saturation operation can be enabled using the appropriate bus registers setting.

The coefficients after 1-D operation are stored in the Transpose RAM-1 509, column-wise. The transpose RAM 509 contains one coefficient per address and it takes one clock to access one coefficient in the RAM. The size of this buffer is 2 blocks of data, i.e., 128 locations deep and is used as a double buffer. Once one block data (all 64 coefficients of an 8×8 block) processing is complete, then the next block of 64 coefficients are routed to second buffer T2 in PASS-2 sub module 609 and, concurrently, the first buffer and the block type information already collected is passed onto PASS-2 sub module 307 for continuing the inverse transformation operation.

The current PASS-1 Data Path 503 is designed with four pipelined stages. First pipeline stage consists of two-stage multipliers, multiplying four pairs of the coefficient data and constant matrix coefficients. They are pipelined in order to effect optimum possible timing closure, i.e., minimize the processing time. This is followed by a second pipeline stage for registering the multipliers' results and subsequently adding these four results by an adder. Third pipeline stage is to register the partial sum of products after adder and generic rounding operations. This result processed in a pipelined manner is separated as a pair of even results and a pair of odd results. Fourth stage registers the output of the adder/subtractor unit that adds or subtracts one pair of an even and an odd result mentioned earlier. This is stored in the Transpose RAM-1 509. Addressing Sequence for writing block data into Transpose RAM-1 509 is shown in Table 1, which defines the addressing for block data writes in T1 buffer after PASS-1 operation. Block entries in column 1 signifies 8×8 numbers of coefficients.

TABLE 1

| Address sequence of writing into Transpose RAM-1 (T1 buffer) | | |
|---|---|---|
| Block | Buffer | Addresses (Row Wise) |
| Y0 | T1 | 0 to 63 |
| Y1 | T1 | 64 to 127 |
| Y2 | T1 | 0 to 63 |
| Y3 | T1 | 64 to 127 |

TABLE 1-continued

| Address sequence of writing into Transpose RAM-1 (T1 buffer) | | |
|---|---|---|
| Block | Buffer | Addresses (Row Wise) |
| Cb | T1 | 0 to 63 |
| Cr | T1 | 64 to 127 |

The PASS-1 controller state machine 501 description is as follows:

When the state machine receives a block start signal from the DINO decoder state machine 401, the operation commences. This state machine works in terms of block-wise boundaries. Therefore, after completing the processing of one block of data, the controller waits for the next block start trigger from the DINO DECODER 301 in order to start the processing of the next block.

Depending upon the block type, the state machine generates the control signals for the following operations:

Signals to/from the appropriate row of the matrix coefficients from the RBUS coefficients register and pass them to multipliers to perform the IT matrix multiplication.

Signals to select the odd and even coefficients from the coefficient registers.

Based on the block type and, even and odd multiplications, it generates the even_reg_sel/odd_reg_sel and even_reg_enb/odd_reg_enb signals to store the partial sum of product in partial registers.

Signals to select the correct partial registers and pass onto add/subtract unit.

Signals to control add/subtract.

This state machine generates the control signals for rounding/saturation based on the configuration registers' programming for the block under operation. This state machine also generates the T1 buffer address and a write strobe to write the PASS-1 result into the T1 buffer. The complete functionality of this state machine is divided into five states. The functionality of all five states is explained below.

WAIT_TRG:

Wait for block_start_trigger from DINO decoder state machine 401.

When block_start_trigger arrives, go to MTX_A_SEL.

Based on the block type, select coefficient matrix 'A' first row and even coefficient registers.

MTX_A_SEL:

In this state, look for the block type and, based on the block type, generate a trigger to either AB_MTX_CNT or A_MTX_CNT based on the block type. If block type is 8×8, 8×4 or 4×8, then trigger (trigger_AB_mtx) to AB_MTX_CNT state machine. If block type is 4×4 then, trigger (trigger_A_mtx) to A_MTX_CNT state machine.

If block type is 4×4 or 4×8, then stay in the same state and keep on selecting the right coefficient matrix 'A' rows and increment the row number and generate the appropriate signals to select the even coefficient registers.

Once all the sub-block processing is complete, return to WAIT_TRG state.

If block type is 8×8 or 8×4, then go to MTX_B_SEL and, select appropriate rows and odd coefficient registers of coefficient matrix 'B'.

Generate the load enable strobe to product registers.

MTX_B_SEL:

In this state, based on the block type, select the coefficient matrix-B rows and increment the row number and, generate the signals to select the odd coefficients.

If block processing is not complete, then go to MTX_B_SEL state.

Based on the block type and row number, look for the end of block. If end of block is received, then go to WAIT_TRG.

Generate the load enable of product registers.

AB_MTX_CNT:

Select even registers and generate load enable of even registers.

Select odd registers and generate the load enable of odd registers.

Select the correct even and odd registers for addition and subtraction.

Generate the add_sub strobe to adder/subtractor unit.

Based on the decode type, select generic rounding1.

Generate the load enable for final coefficient registers.

Based on block type, select the correct value after rounding and truncation.

Generate the T1 buffer address and write strobe and write data in T1 buffer.

A_MTX_CNT:

Select even register0 and generate load enable of even registers.

Select the correct even register for additions.

Select the input data for the adder/subtractor unit.

Generate the add strobe to adder.

Generate the load enable for final coefficient registers.

Based on block type, select the appropriate value after rounding and truncation.

Generate the T1 buffer address, write strobe and write data into T1 buffer.

Figure 6:
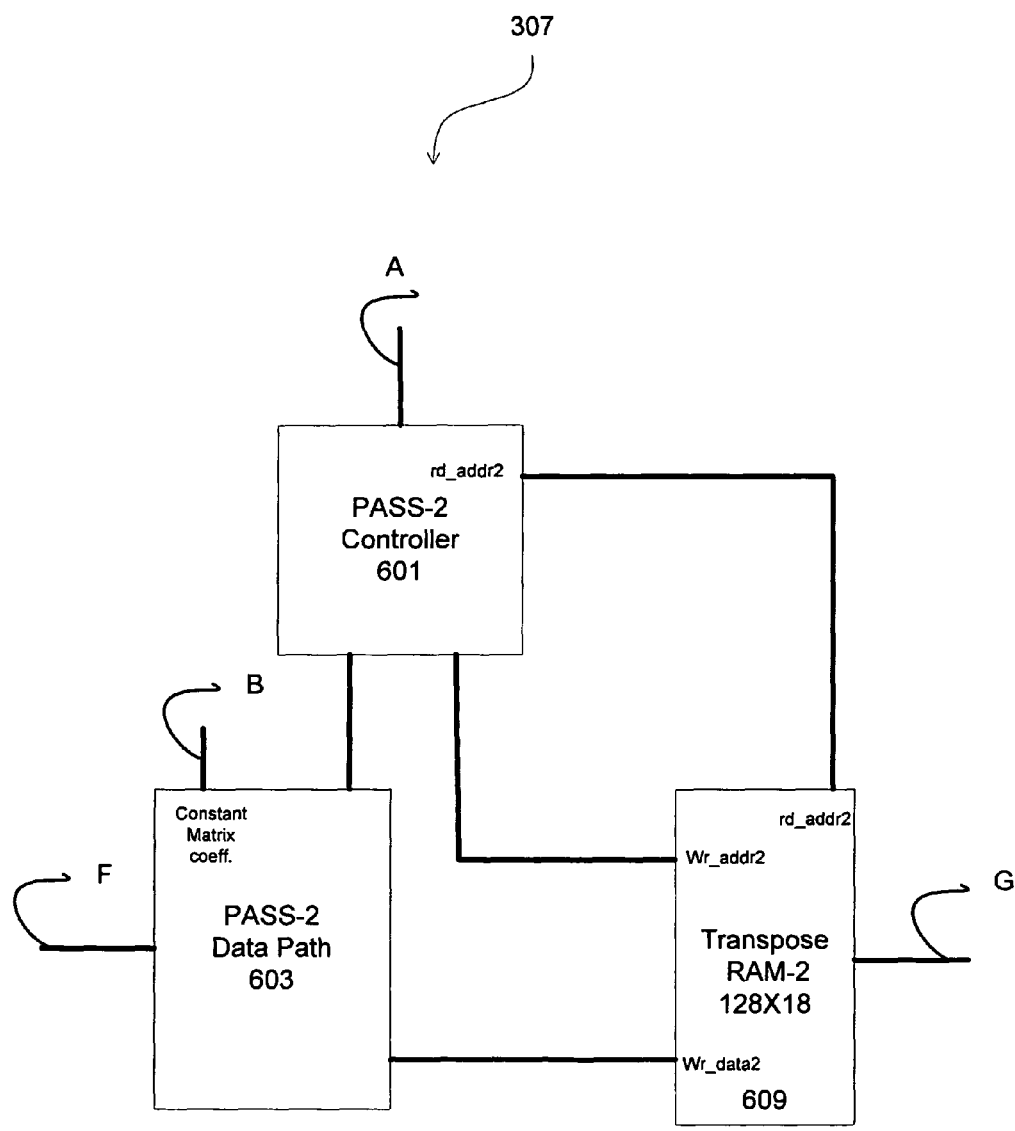
FIG. 6 is a schematic block diagram illustrating a PASS-2 Inverse Transform of described in FIG. 3.

FIG. 6 is a schematic block diagram illustrating a PASS-2 Inverse Transform 307 of described in FIG. 3. Once the PASS-1 operation on a block is completed, this sub-module reads the coefficient data from the transpose RAM-1 509 and applies the second 1-D IT operation based on the block type, and stores them in transpose form in transpose RAM-2 609.

The PASS-2 Data Path 603 description is as follows:

The data path of this sub-module is almost similar to PASS-1 data path 503 except that the data width and rounding/saturation logic is different. It reads the data from T1 buffer and writes into cache registers followed by copying them into coefficients registers.

Addressing Sequence for reading block data in Transpose RAM-2 609 is shown in Table 2, which describes the addressing for block data read from the T1 buffer after PASS-2 operation and, write into T2 buffer. A block is a 8×8 data and hence it includes sufficient number of sub-blocks, if coded that way. The highlighting is used in the description of I_PCM macro-block handling in order to facilitate ease of understanding.

TABLE 2

Address sequence of reading into Transpose RAM-2 (T2 buffer)
Reads from T1 buffer and passes onto PASS-2 Data Path 403

| Component | Buffer | Addresses (Column Wise) |
|---|---|---|
| Y0 | T1 | 0, 8, 16, ... 56, 1, 9, ... 63 |
| Y1 | T1 | 64, 72, 80, ... 120, 65, 73, ... 127 |
| Y2 | T1 | 0, 8, 16, ... 56, 1, 9, ... 63 |
| Y3 | T1 | 64, 72, 80, ... 120, 65, 73, ... 127 |
| Cb | T1 | 0, 8, 16, ... 56, 1, 9, ... 63 |
| Cr | T1 | 64, 72, 80, ... 120, 65, 73, ... 127 |

TABLE 3

Address sequence of writing into Transpose RAM-2 (T2 Buffer)
Writes in T2 buffer in PASS-2 operations.

| Component | Buffer | Addresses (Column Wise) |
|---|---|---|
| Y0 | T1 | 0, 8, 16, ... 56, 1, 9, ... 63 |
| Y1 | T1 | 64, 72, 80, ... 120, 65, 73, ... 127 |
| Y2 | T1 | 0, 8, 16, ... 56, 1, 9, ... 63 |
| Y3 | T1 | 64, 72, 80, ...120, 65, 73, ... 127 |
| Cb | T1 | 0, 8, 16, ... 56, 1, 9, ... 63 |
| Cr | T1 | 64, 72, 80, ... 120, 65, 73, ... 127 |

The PASS-2 controller (state machine) 601 description is as follows:

This state machine is partitioned into two state machines running in parallel. The first state machine is employed to read the block data from T1 buffer and write them into cache registers. The second state machine is employed to control the data flow of PASS-2 data path 603.

First State Machine:

This state machine waits for T1 buffer availability for reading a block of data. When T1 buffer is ready, based on block type, it reads the data from T1 buffer and copies them into cache registers. When the first row of a block data read from T1 buffer is complete, it will check for the T2 buffer availability for writing a block of data. When T2 buffer is available, it generates a trigger signal to the second state machine of the PASS-2 sub module. Once T2 buffer is available, it reads one block of data from T1 and writes them in cache register.

Second State Machine:

When this state machine receives a block start signal from PASS-2 first state machine, it starts operating. This state machine works at block boundary. Hence after completing one block data processing, to start next block it will again wait for the block start trigger from DINO DECODER 301. Based on the block type, this state machine generates the control signals for the following operations:

Signals to/from the appropriate row of the matrix coefficient from the RBUS coefficient registers and passes them to multipliers to perform the second stage 1-D IT matrix multiplication.

Signals to select the odd and even coefficients from the coefficient registers.

Based on the block type and even and odd multiplications, it generates the even_reg_sel/odd_reg_sel and even_reg_enb/odd_reg_enb signals to store the partial sum of products in partial registers.

Signals to select the appropriate partial register and passes to add/subtract unit.

Generates even_reg_enb/odd_reg_enb signals to store the partial sum of products in partial registers.

Signals to select the appropriate partial register and passes to add/subtract unit.

Signals to control add/subtract.

This state machine generates the control signal for rounding or saturation based on the configuration register programming for the block under operation. This state machine also generates the T1 buffer address and write strobe to write the PASS-2 result in T2 buffer. The complete functionality of first state machine is divided into two states. The functionality of both states is as follows.

First State Machine Details:

WAIT_BUF_RDY:

Wait for a block data in PASS-1 T1 buffer to become ready. Once the buffer is ready, then based on the block type, read first eight or four coefficient data into cache registers 0-7. Once cache registers are written, and then check for the PASS-2 T2 buffer availability. If T2 buffer is not ready, then wait for T2 buffer ready and don't read any more data from T1 buffer. Once the T2 buffer is ready, copy cache registers data into coefficient registers and generate a block start trigger (block_start_trigger) to PASS-2 pipeline control state machine and go to GET_DP2_DATA state. Generate the block start trigger at every block boundary.

GET_DP2_DATA:

Read coefficient data from T1 buffer into cache registers 0-7 based on the block type. Once cache registers are written, copy cache registers data into coefficient registers. This state machine also keeps the row counts in a block or a sub-block. Once one block data is consumed, go to WAIT_TBUF_RDY state.

The complete functionality of the first state machine is divided into two states. The functionality of both states is as follows:

Second State Machine Details:

WAIT_TRG:

Wait for block start trigger from GET_DP2_DATA state. When block start trigger arrives, go to MTX_A_SEL. Based on the block type, select coefficient matrix A first row and even coefficient registers.

MTX_A_SEL:

In this state, look for the block type and based on block type, generate a trigger to either AB_MTX_CNT or A_MTX_CNT based on the block type. If block type is 8×8, 8×4 or 4×8 then apply trigger (trigger_AB_mtx) to AB_MTX_CNT state machine. If block type is 4×4, then apply trigger (trigger_A_mtx) to A_MTX_CNT state machine. If block type is 4×4 or 4×8, then stay in the same state and keep on selecting appropriate coefficient matrix A rows and increment the row number and, generate the appropriate signals to select the even coefficient registers. Once all the sub-block processing is complete, go back to WAIT_TRG state. If block type is 8×8 or 8×4, then go to MTX_B_SEL state and select coefficient matrix B appropriate rows and odd coefficient registers. Generate the load enable strobe of product registers.

MTX_B_SEL:

In this state, based on the block type, select the coefficient matrix B rows and increment the row number, also generate the signals to select the odd coefficients. If block processing is not complete, then wait in the MTX_B_SEL state. Based on the block type and row number, look for the end of block. If end of block is received, then go to WAIT_TRG state. Generate the load enable of product registers.

AB_MTX_CNT:

Select even registers and generate load enable for even registers. Select odd registers and generate the load enable for odd registers. Select the appropriate even and odd registers for additions and subtractions. Generate the add_sub strobe to adder/subtractor. Based on decode type, select generic rounding1. Generate the load enable for final coefficient registers. Based on block type, select the right value after rounding and truncation. Generate the T2 buffer address, write strobe and write data in buffer T2.

A_MTX_CNT:

Select even registers and generate load enable for even registers. Select the right even data for additions. Select the input data for the adder/subtractor unit. Generate the add strobe to adder. Also generate the load enable for final coefficient registers. Based on block type, select the correct value after rounding and truncation. Generate the T2 buffer address, write strobe and write data in buffer T2.

In general, in accordance with the present invention, as soon as the data is available for a macro block, it is passed on to the data input of PASS-1 data-path sub module 503 and, the PASS-1 sub module starts its operation using the control parameters received for the corresponding block. In the case of the bypass mode, the DINO data is also pushed into DINO sequence FIFO 311 to bypass the IT functionality and to pass all DINO word without any change. In the case of AVC I_PCM MB, the incoming data is passed on to the Transpose RAM-1 509 (also referred to as T1 buffer) and the Transpose RAM-2 609 (also called T2 buffer) in succession in order to convert the 16×16 raster scan data into a 8×8 raster scan data.

Figure 7:
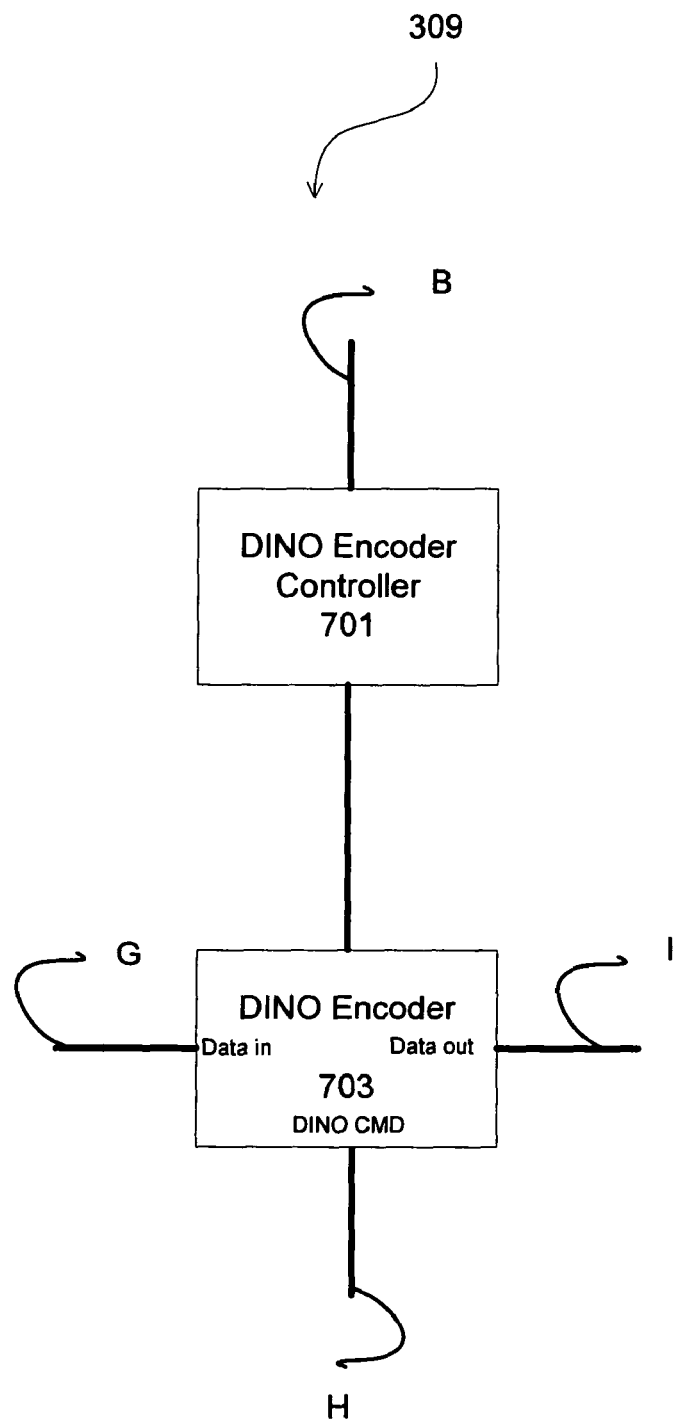
FIG. 7 is a schematic block diagram illustrating a DINO ENCODER described in FIG. 3.

FIG. 7 is a schematic block diagram illustrating a DINO ENCODER 309 described in FIG. 3. The DINO ENCODER sub-module 309 data-path is embedded into the DINO Encoder module 703. After a system reset, this module reads the DINO sequence command FIFO 311. If FIFO 311 has data, it is popped out and put into an output register. Data from the output register is sent out to MCU-IP 111, using Ready/Accept protocol. All macro block commands are also passed on to the MCU-IP 111.

Data can come from three sources: Command sequence FIFO 311 (in bypass mode), PASS-2 Transpose RAM-2 609 (non I_PCM as well as I_PCM functional modes) and PASS-1 Transpose RAM-1 509 (in I_PCM MB). Hence, the control logic is different for these three cases. The DINO Encoder controller 701 gets the block type information from PASS-2 controller 601 and macro-block type information from DINO DECODER 301.

Addressing of the PASS-2 Transpose buffer 609 depends on the two types of modes: the non I_PCM mode (also referred to as normal functional mode) and the I_PCM mode. For normal functional mode operation, each of the double buffers in the PASS-2 Transpose buffer 609 contains a full 8×8 pixel block and is sent out to MCU-IP 111.

For the normal functional mode, the DINO ENCODER 309 waits for a full buffer indication. When it gets one, it will output that into the MCU-IP 111. This is repeated five more times, each time with a different block, to finish the entire macro-block. After the full macro-block is emptied into the MCU-IP 111, it shifts its attention back to the FIFO 311.

In the case of AVC I_PCM MB, both the Transpose RAM buffers 509 and 609 together will be used as a double buffer. Addressing would be appropriately generated. This sub-module has handshake with the DINO Decoder controller 401 (IPCM_MB state machine) and reads the data from the appropriate buffer and sends the data in a 8×8 raster scan order. In the bypass mode, DINO ENCODER 309 looks only at the FIFO 311 and outputs it to the MCU-IP 111, without any modification.

Addressing sequence for reading data from T2 buffer by DINO ENCODER 309 is shown in Table 4. DINO Encoder Controller 701 description is as follows:

TABLE 4

Addressing sequence for reading data from T2 buffer

| Component | Buffer | Addresses (Row-wise) |
| --- | --- | --- |
| Y0 | T2 | 0 to 63 |
| Y1 | T2 | 64 to 127 |
| Y2 | T2 | 0 to 63 |
| Y3 | T2 | 64 to 127 |
| Cb | T2 | 0 to 63 |
| Cr | T2 | 64 to 127 |

1.1.1.1

This is a state machine that looks at DINO sequence command FIFO 311. If FIFO 311 has data, it is popped out, put into the output register and sent to MCU-IP 111 using ready/accept protocol. After an appropriate command from Command Sequence FIFO 311, it will check for the T2 buffer availability. Once T2 buffer is available, it reads one block data from T2 buffer, encode them in DINO Encoder data path 703 and send it to MCU-IP 111 using ready/accept protocol. This state machine also takes care of handling I_PCM MB data. In the case of I_PCM MB, it works with DINO DECODER 301 in handshake mode. This state machine reads block data from both T1 and T2 buffers and generates the read addresses for both the buffers. The complete functionality of this state machine is divided into three states.

DINO_CMD_ENC:

Look for the DINO command at the DINO sequence FIFO 311. If FIFO 311 has data, pop and write it into output register. Keep passing all command without any changes into MCU-IP 111.

In the case of enabled bypass mode, keep both command and data from sequence command FIFO 311 and send them to MCU-IP 111 without any change.

When command is COFS, go to either WAIT_TBUF2_RDY or IPCM_RD_DATA based on MB type.

WAIT_TBUF2_RDY:

Wait for one block of data to be ready in T2 buffer. When data is ready, go to the READ_DATA state.

READ_DATA:

Read one block of data in the 8×8 raster scan order, encode them in DINO data 403 and send them to MCU-IP 111.

At the end of the block, go to the WAIT_TBUF2_RDY state for buffer switching.

IPCM_READ_DT:

First wait for the T1 buffer ready. If T1 buffer is ready, then read the Y0, Y1 from T1 buffer in the 8×8 raster scan order, encode them in DINO words and send them to MCU-IP 111.

Once Y0, Y1 reads are complete, then wait for the T2 buffer ready signal. If T2 buffer is ready, then read the Y2, Y3 from T2 buffer in the 8×8 raster scan order, encode them in DINO words and send them to MCU-IP 111.

Once Y2, Y3 reads are complete, then wait for the T1 buffer ready. If it is ready, then read the Cb from T1 buffer in the 8×8 raster scan order, encode them in DINO words and send them to MCU-IP 111.

Once Cb read is complete, then wait for the T2 buffer ready. If it is ready, then read the Cr from T2 buffer in the 8×8 raster scan order, encode them in DINO words and send them to MCU-IP 111.

I_PCM handling scheme:

Video data from IQ 109 for an I_PCM macro-block arrives at the DINO DECODER 301 input interface of the IT 103 in the 16×16 raster scan order. In this scheme, IT 103 should not process inverse transform on the pixel coefficient values, but only needs to convert the arriving MB (16×16 pixel information) into six blocks (four luminance blocks Y0-Y4 and two chrominance blocks Cb, Cr) in a 8×8 raster scan order, to keep its output order consistent for all the types of macro-blocks that it handles. This raster scan order change has to be achieved without compromising the following three goals:

1. No extra buffers; manage with the available 2 transpose RAMs (each of size 128 depth).
2. No input stalls, provided evacuation into MCU-IP 111 is smooth and without stalls.
3. Achieving the first two goals should not make IT block's control logic too complex.

The following is a scheme to handle I_PCM inside IT that meets all the above three goals. A description of this scheme is as follows:

The core issue with I_PCM macro-block is in the luminance blocks since it arrives from IQ 109 in a 16×16 raster scan order, and needs to go out to MCU-IP 111 in an 8×8 raster scan order. For regular macro-blocks, i.e., for non-I_PCM type, both T1 and T2 (Transpose RAMs) 509 and 609 inside IT 103 are configured as double buffers each, with each buffer containing 64 locations. For I_PCM macro-blocks, the T1 and T2 buffers are used in a slightly different way. It can be viewed as T1 and T2 together forming a double buffer. The following tables, Table 5 and Table 6, give the address sequencing for I_PCM macro-blocks.

TABLE 5

Write Address Sequence in T1 and T2 buffers for the I_PCM MBs

| Component | Buffer | Addresses |
| --- | --- | --- |
| Top 4 lines of (Y0, Y1) | T1 | 0 to 63 |
| Bot 4 lines of (Y0, Y1) | T1 | 64 to 127 |
| Top 4 lines of (Y2, Y3) | T2 | Y2: 64 to 95; Y3: 0 to 31 |
| Bot 4 lines of (Y2, Y3) | T2 | Y2: 96 to 127; Y3: 32 to 63 |
| Cb | T1 | 64 to 127 |
| Cr | T2 | 64 to 127 |

TABLE 6

Read Address Sequence in T1 and T2 buffers for the I_PCM MBs

| Component | Buffer | Addresses |
| --- | --- | --- |
| Y0 | T1 | 0, 2, 4, . . . 126 |
| Y1 | T1 | 1, 3, 5, . . . 127 |
| Y2 | T2 | 64 to 127 |
| Y3 | T2 | 0 to 63 |
| Cr | T2 | 64 to 127 |

In order to verify whether the above addressing sequence achieves the three goals set earlier, all different cases around I_PCM macro-block handling have to be analyzed. There are three cases primarily:

(1) I_PCM macro-block followed by a second I_PCM macro-block
(2) I_PCM followed by a regular (non I-PCM) macro-block and
(3) A regular macro-block followed by LPCM macro-block.

The timelines for each of these three cases are given in Table 7 to Table 9. Each active column is one block processing time, i.e, optimally, 64 clock cycles. It can have a few dead clock cycles between two blocks, but zero dead cycles between blocks is the design goal and, is achieved by taking into account the pipeline latency into the control logic generation. The timelines show certain "spots" (highlighted by different colors) that show different block data (both within and across macro-blocks) on the two ports (write and read) of one buffer. Such data are seen to occupy different addresses in the buffer and hence such activities can indeed happen simultaneously, as required and, as shown by the timelines. For example, in the case (1), the spot with this highlighted color has top 4 lines of Y0 and Y1 data of a second macro-block coming in into buffer T1 from IQ 109, while Cb of the first macro-block is being simultaneously output to MCU-IP 111. The addressing sequence tables, in Table 5 and Table 6, for this case shows that the two activities do not have any common buffer locations; 0 to 63 for top 4 lines of Y0, Y1 pair and 64 to 127 for Cb. The addressing sequence tables use similar coloring to help locate such a spot. From these timelines, it is clear that I_PCM macro-blocks suffer similar pipeline latencies as regular macro-blocks, i.e., two block processing times (approx. 128 clock cycles). This is another aspect that helps meet the "no input stall" goal.

TABLE 7

Case (1) : I_PCM followed by I_PCM macro-block
Read and write sequence of I_PCM MB blocks in T1 and T2 buffers

| Buffer | Op. | I_PCM macroblock | | | | | | | I_PCM macroblock | | | |
|---|---|---|---|---|---|---|---|---|---|---|---|---|
| T1 | Write | T(Y0,Y1) | B(Y0,Y1) | NOP | NOP | Cb | | T(Y0,Y1) | B(Y0,Y1) | | | |
|    | Read  | NOP      | NOP      | Y0  | Y1  | NOP | NOP | Cb | | | | |
| T2 | Write |          |          | T(Y2,Y3) | B(Y2,Y3) | Cr | NOP | NOP | T(Y2,Y3) | B(Y2,Y3) | | |
|    | Read  |          |          | NOP | NOP | Y2 | Y3 | Cr | | | | |

TABLE 8

Case (2) : I_PCM followed by regular (Non-I_PCM) macro-block
Read and write sequence of I_PCM MB blocks in T1 and T2 buffers

| Buffer | Op. | I_PCM macroblock | | | | | | Non-I_PCM macroblock | | | |
|---|---|---|---|---|---|---|---|---|---|---|---|
| T1 | Write | T(Y0,Y1) | B(Y0,Y1) | NOP | NOP | Cb | | Cb | Y1 | Y2 | Y3 |
|    | Read  | NOP | NOP | Y0 | Y1 | NOP | NOP | Cr | Y0 | Y1 | Y2 |
| T2 | Write |     |     | T(Y2,Y3) | B(Y2,Y3) | Cr | NOP | Y0 | Y1 | Y2 | |
|    | Read  |     |     | NOP | NOP | Y2 | Y3 | Cr | | | |

TABLE 9

Case (3) : Non-I_PCM followed by I_PCM macro-block
Read and write sequence of I_PCM MB blocks in T1 and T2 buffers

| Buffer | Op. | Non I_PCM macroblock | | | | | | | I_PCM macroblock | | |
|---|---|---|---|---|---|---|---|---|---|---|---|
| T1 | Write | Y0 | Y1 | Y2 | Y3 | Cb | Cr | T(Y0,Y1) | B(Y0,Y1) | | |
|    | Read  | | Y0 | Y1 | Y2 | Y3 | Cb | — | Y0 | Y1 | |
| T2 | Write | Y0 | Y1 | Y2 | Y3 | Cb | Cr | NOP | T(Y2,Y3) | B(Y2,Y3) | |
|    | Read  | | Y0 | Y1 | Y2 | Y3 | Cb | Cr | | | |

It may be noted that a fourth case can also be encountered while decoding the video data stream. This possibility is a non-I_PCM followed by a non I_PCM macro-block, which is taken care of by modifying the case (3) by repeating the first MB (which is a Non-I_PCM macroblock) sequence for the second MB as well as shown in Table 10.

TABLE 10

Case (4): Non I_PCM followed by Non I_PCM macro block
Read and write sequence of I_PCM
MB blocks in T1 and T2 buffers

| Buffer | Op. | Non I_PCM macroblock | | | | | | Non I_PCM macroblock | | | | | |
|---|---|---|---|---|---|---|---|---|---|---|---|---|---|
| T1 | Write | Y0 | Y1 | Y2 | Y3 | Cb | Cr | Y0 | Y1 | Y2 | Y3 | Cb | Cr |
|    | Read  |    | Y0 | Y1 | Y2 | Y3 | Cb | Cr | Y0 | Y1 | Y2 | Y3 | Cb |
| T2 | Write | Y0 | Y1 | Y2 | Y3 | Cb | Cr | Y0 | Y1 | Y2 | Y3 | Cb | Cr |
|    | Read  |    | Y0 | Y1 | Y2 | Y3 | Cb | Cr | Y0 | Y1 | Y2 | Y3 |    |

Performance of IT Module:

The IT module 103 is ready to accept a DINO command or data from IQ module 109 every clock cycle. Hence, there will be no stall to IQ side when DINO command decoder is encountered. However, if there is a stall from the external MCU-IP 111 to IT 103, then there will be stall to IQ module as well. IT module 103 operations are pipelined and achieve a nominal throughput of one clock per coefficient. The maximum latency to output first coefficient of a MB is 162 clocks in the case of MPEG-2 8×8 block. The maximum numbers of clock cycles required to complete a MB processing are 555 clocks in the case of MPEG-2. The latency to output first coefficient of a MB is 152 clocks in the case of AVC blocks. The number of clock cycles required to complete one MB processing are 545 clocks in case of AVC.

As one of average skill in the art will appreciate the terms: MPEG, AVC, I_PCM, IT, MB, coefficient, transform, discrete cosine transform, transform, transpose, buffer, clock cycles, pipelining, latency, concurrency, parallel, successive, ready/accept protocol, Motion Compensation Unit-Intra-Prediction etc. as may be used herein, provides an industry-accepted tolerance to its corresponding terms. The invention disclosed herein is susceptible to various modifications and alternative forms. Specific embodiments, therefore, have been shown by way of example in the drawings and detailed descriptions. It should be understood, however, that the drawings and detailed descriptions thereto are not intended to limit the invention to the particular form disclosed, but on the contrary, the invention is to cover all modifications, equivalents and alternatives falling within the spirit and scope of the present invention as defined by the claims.

We claim:

1. An apparatus comprising:
   a video decoder with an inverse integer module, the video decoder comprising:
   the inverse integer module that allow advanced video codec (AVC) Intra-block pulse code modulation (I_PCM) macro blocks to pass through without performing inverse transform operation;
   the inverse integer module that processes non AVC I_PCM macro blocks such that the luminance coefficients are reordered to 8×8 raster scan order from their original 16×16 raster scan order creating an inverse transform (IT) output coefficients; and
   the inverse integer module that performs a 4×4 inverse integer transform on a given macro block (MB) and all its sub blocks for MPEG-2 operations.

2. The apparatus comprising the video decoder with an inverse integer module of claim 1, further comprising:
a motion compensation unit/intra-prediction module, wherein the inverse integer module communicates the IT output coefficients to the motion compensation unit/intra-prediction module for further processing.

3. The apparatus comprising the video decoder with an inverse integer module of claim 2, wherein the inverse integer module analyses the I_PCM macro blocks in case of AVC stream input and passes them to the motion compensation unit/intra-prediction module without performing inverse integer transform operation.

4. The apparatus comprising the video decoder with an inverse integer module of claim 2, wherein the inverse integer module creates an 8×8 inverse discrete cosine transform (DCT) in the case of MPEG-2 based input.

5. The apparatus comprising the video decoder with an inverse integer module of claim 1, further comprising:
an inverse transfer bypass mode that can be enabled or disabled;
wherein the inverse transform module conducts a plurality of inverse transfer operations, and wherein the plurality of inverse transfer operations are completely bypassed when the inverse transfer bypass mode is enabled.

6. The apparatus comprising the video decoder with an inverse integer module of claim 1, wherein the IT module further comprises:
a data input data output (DINO) input interface connected to an external inverse quantizer (IQ) module output;
a DINO output interface connected to an external motion compensation unit/intra-prediction (MCU-IP) module;
and a RBUS interface that is used to connect to an external control processor MIPS processor (CP-MIPS).

* * * * *